(No Model.)
P. MULLER.
HOIST AND DUMP FOR GRAIN OR COAL.
No. 562,844. Patented June 30, 1896.
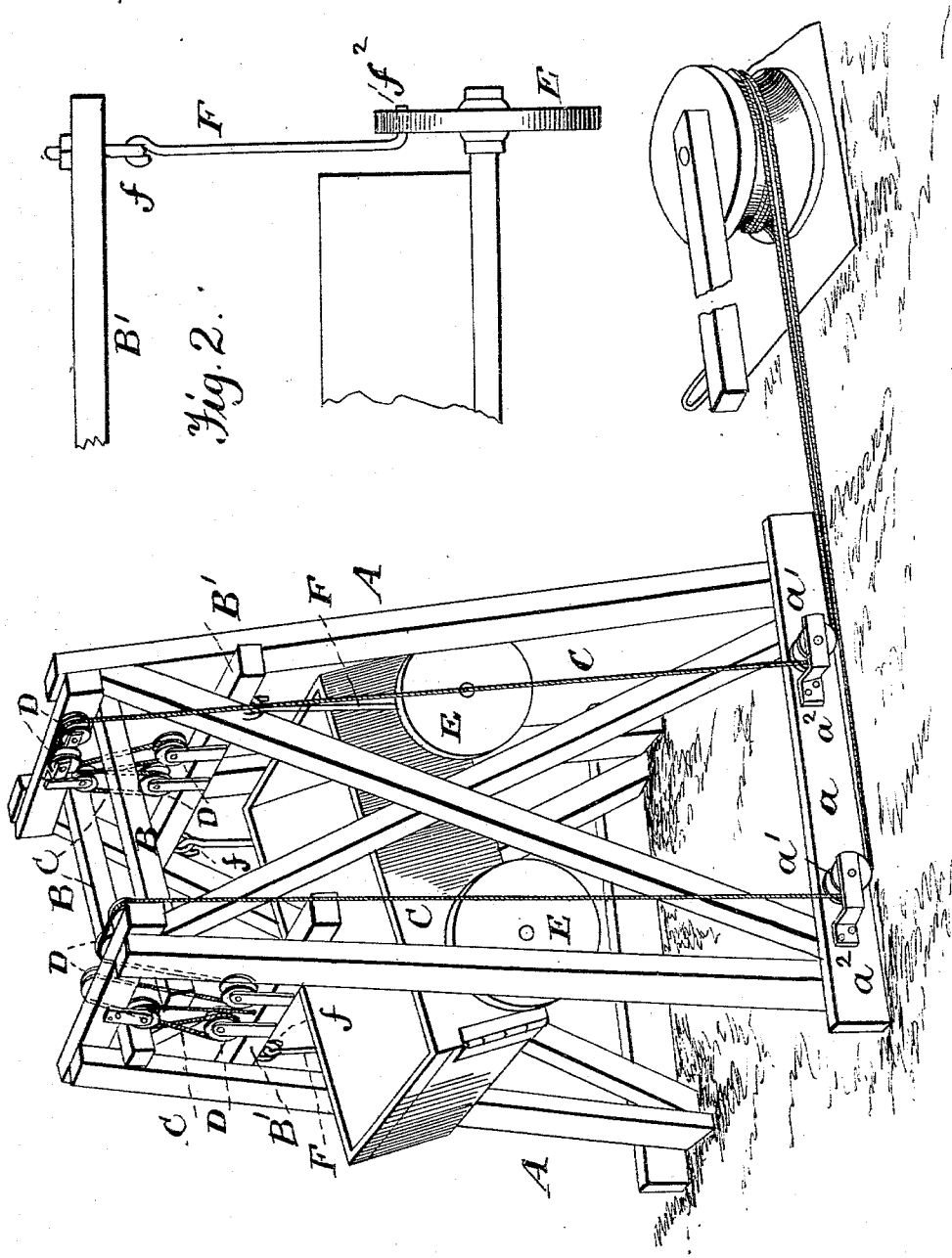
Witnesses.
A. Ruppert.
G. B. Fowlis
Inventor.
Peter Muller
Per
Thomas P. Simpson
atty

UNITED STATES PATENT OFFICE.

PETER MULLER, OF TABLE ROCK, NEBRASKA.

HOIST AND DUMP FOR GRAIN OR COAL.

SPECIFICATION forming part of Letters Patent No. 562,844, dated June 30, 1896.

Application filed March 2, 1896. Serial No. 581,516. (No model.)

*To all whom it may concern:*

Be it known that I, PETER MULLER, a citizen of the United States, residing at Table Rock, in the county of Pawnee and State of Nebraska, have invented a certain new and useful Improvement in Hoists and Dumps for Grain or Coal; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to coal and grain hoists and dumps, and it consists in improving them, as hereinafter described and claimed.

Figure 1 of the drawings is a perspective view of the elevator-frame and system of pulleys applied to a wagon, and Fig. 2 a detail view of one of the rods which connect the pulley mechanism with the wheels of the wagon.

In the drawings, A represents the elevator-frame, on the lower bar $a$ of which are arranged the pulleys $a'$ $a'$ in keepers $a^2$ $a^2$.

B B' are four parallel cross-bars, of which the two upper ones B B are fixed on cross-pieces at right angles to the other two B' B'. The ropes C C pass over the pulleys D on the cross-bars, there being five pulleys on one side and six on the other.

Of course there is nothing broadly new in combining a system of pulleys so as to lessen the power required for hoisting purposes.

I connect the movable cross-bars B' B' with the wheels E of the wagon by means of a rod F, having the hook-and-eye joint $f$ and detachably engaging the wheels E by a bent end $f^2$, which passes under or through the felly. The ropes C C are carried down under and over the pulleys D D and under pulleys $a'$ $a'$ to a windlass operated by horse-power or any other suitable power.

The elevator-frame A is made higher in front than in the rear, so as to let the wagon have a rearward incline when the same has been hoisted to the required height. Then the tail-gate is taken out or swung out on hinges, so as to connect easily the rear of wagon with a discharge spout or trough leading to a bin or other receptacle for the load.

Having thus described all that is necessary to a full understanding of my invention, what I claim as new, and desire to protect by Letters Patent, is—

The movable cross-bars B' B' and the rods F pivotally connected therewith, the said rods having bent ends to connect detachably with the wheels of wagon, in combination with the frame A having the front higher than the rear, a system of pulleys arranged substantially as shown, and ropes carried over and under the pulleys as set forth.

In testimony whereof I affix my signature in presence of two witnesses.

PETER MULLER.

Witnesses:
DAVID K. MILLER,
W. L. TAYLOR.